United States Patent
Molayem

(10) Patent No.: US 9,314,126 B2
(45) Date of Patent: Apr. 19, 2016

(54) BEVERAGE CONTAINER HAVING BUILT-IN INFUSER AND PASSIVE COOLING ELEMENT

(71) Applicant: Tabletops Unlimited, Inc., Carson, CA (US)

(72) Inventor: Daryoosh Molayem, Carson, CA (US)

(73) Assignee: Tabletops Unlimited, Inc., Carson, CA (US)

( * ) Notice: Subject to any disclaimer, the term of this patent is extended or adjusted under 35 U.S.C. 154(b) by 225 days.

(21) Appl. No.: 14/185,576

(22) Filed: Feb. 20, 2014

(65) Prior Publication Data
US 2015/0230651 A1    Aug. 20, 2015

(51) Int. Cl.
| | |
|---|---|
| *A47J 31/00* | (2006.01) |
| *A47J 31/06* | (2006.01) |
| *A47J 31/44* | (2006.01) |
| *F25D 3/08* | (2006.01) |
| *A47J 41/00* | (2006.01) |
| *A47G 19/22* | (2006.01) |
| *A47J 31/60* | (2006.01) |

(52) U.S. Cl.
CPC .......... *A47J 31/0636* (2013.01); *A47G 19/2288* (2013.01); *A47J 31/44* (2013.01); *A47J 31/605* (2013.01); *A47J 41/0044* (2013.01); *F25D 3/08* (2013.01)

(58) Field of Classification Search
CPC ... A47J 31/0636; A47J 31/20; A47J 41/0044; A47J 41/0038; A47G 19/2288
USPC .......... 99/322, 323, 317; 220/592.17, 592.16, 220/703; 62/331, 457.3, 457.4; 222/146.6
See application file for complete search history.

(56) References Cited

U.S. PATENT DOCUMENTS

| | | | |
|---|---|---|---|
| 5,913,964 A | 6/1999 | Melton | |
| D472,563 S | 4/2003 | Roth et al. | |
| 6,598,418 B2 * | 7/2003 | Holley, Jr. | .......... B65D 81/3255 62/457.3 |
| 7,958,816 B2 * | 6/2011 | Lin | .......... A47J 31/02 99/323 |
| 8,061,545 B2 | 11/2011 | Roth et al. | |
| 8,205,542 B2 | 6/2012 | Gilbert | |
| 8,307,755 B2 * | 11/2012 | Shen | .......... A47J 31/005 220/501 |
| 8,720,321 B2 * | 5/2014 | Neace, Jr. | .......... A47J 31/002 99/296 |
| 2002/0170874 A1 | 11/2002 | Hou | |
| 2010/0018982 A1 * | 1/2010 | Liu | .......... A47J 27/004 220/592.17 |
| 2012/0234789 A1 | 9/2012 | Mason | |

(Continued)

OTHER PUBLICATIONS

"Cool Gear 28 Oz Ez-freeze Water Bottle—Infusion—BPA Free—PVC Free—Phthalates Free", Cool Gear, Amazon.com, Internet search Nov. 20, 2012, http://www.amazon.com/Cool-Gear-Ez-freeze-Water-Bottle/dp/B001 . . ., (1 page).
"Cool Gear Ez-Freeze 28 oz Infusion Sports Water Bottle", eBay, Internet search Nov. 20, 2012, http://www.ebay.com/itm/190722926599, (1 page).

(Continued)

*Primary Examiner* — Reginald L Alexander
(74) *Attorney, Agent, or Firm* — Blakely Sokoloff Taylor & Zafman

(57) ABSTRACT

A hydration bottle that is capable of infusing and cooling a beverage. The hydration bottle includes a container, a lid, an infuser chamber that detachably attaches to the lid, a filter component positioned between the infuser chamber and the lid, and a cold pack that detachably attaches to the bottom end portion of the infuser chamber. The hydration bottle provides both infusion and cooling, only infusion, or no infusion/cooling depending on whether or not the infuser chamber and/or the cold pack are attached. Other embodiments are also described and claimed.

9 Claims, 7 Drawing Sheets

(56) References Cited

U.S. PATENT DOCUMENTS

| | | | |
|---|---|---|---|
| 2013/0206717 A1* | 8/2013 | Lane | A47J 31/18 215/6 |
| 2014/0251153 A1* | 9/2014 | Tien | A47J 31/0636 99/322 |

OTHER PUBLICATIONS

"Cool Gear Tritan EZ-Freeze Water Bottle", Kohl's, Internet search Nov. 21, 2014, http://www.kohls.com/product/prd-1064930/cool-gear-tritan-ez-freeze-water-bottle.jsp?searchTerm=CO . . ., (1 page).

"CreativeWare 3-Gallon Triton Beverage Dispenser", by CreativeWare, Internet search Oct. 14, 2014, https://web.archive.org/web/20120107121229/ http://www.amazon.com/CreativeWare-3-Gallon-Triton-Beverage-Dispenser/dp/B0036POD8Q, (1 page).

"Ez Freeze 28 oz Infusion Sports Bottle", Internet search Nov. 20, 2012, http://www.thecharacterplace.co.uk/freeze-infusion-sports-bottle-p-11 . . ., (1 page).

"Horizon 22oz bottle", Cool Gear Hydration, Internet search Nov. 21, 2012, http://coolgearinc.com/water_bottle_765.html, (1 page).

"Solstice 32oz bottle", Cool Gear Hydration, Internet search Nov. 21, 2012, http://coolgearinc.com/water_bottle_723.html, (1 page).

\* cited by examiner

BEVERAGE CONTAINER HAVING BUILT-IN INFUSER AND PASSIVE COOLING ELEMENT

FIELD

An embodiment of the invention relates to hydration bottles and, more particularly, to a hydration bottle for infusing and cooling a beverage. Other embodiments are also described.

BACKGROUND

Hydration bottles have become increasingly popular as they allows users to stay hydrated wherever they go. Hydration bottles allow for easy storage and transportation of various beverages. Some beverages are better enjoyed by infusing the beverage, for example, with fresh fruits or herbs. Also, some beverages are better enjoyed when chilled.

Thus, it is desirable for a hydration bottle to be able to infuse and cool a beverage.

SUMMARY

An embodiment of the invention is a hydration bottle that can both infuse and cool a beverage. The hydration bottle includes a container, a lid, an infuser chamber, a filter component, and a cold pack. The infuser chamber detachably attaches to the lid and the cold pack detachably attaches to the infuser chamber. As such, the hydration bottle provides both infusion and cooling, only infusion, or no infusion/cooling depending on whether or not the infuser chamber and/or the cold pack are attached. Other embodiments are also described.

The above summary does not include an exhaustive list of all aspects of the present invention. It is contemplated that the invention includes all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

In the following description, for purposes of explanation and not limitation, specific details are set forth in order to provide a thorough understanding of the present invention. However, it will be apparent to one skilled in the art that that some embodiments of the invention may be practiced without these details. In some instances, detailed descriptions of well-known methods and devices are omitted so as to not obscure the description of the present invention with unnecessary detail.

Figure 1:
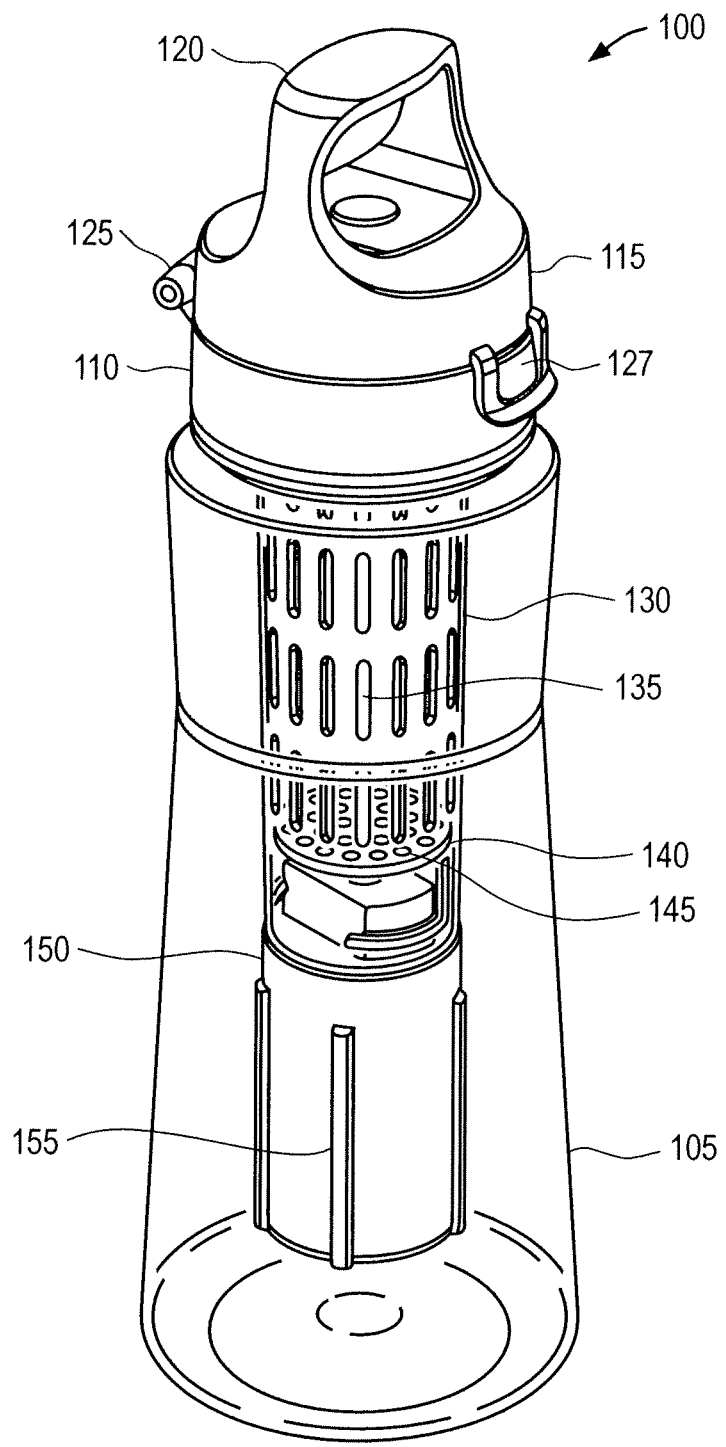
FIG. 1 is a top perspective view of an example hydration bottle.
Figure 2:
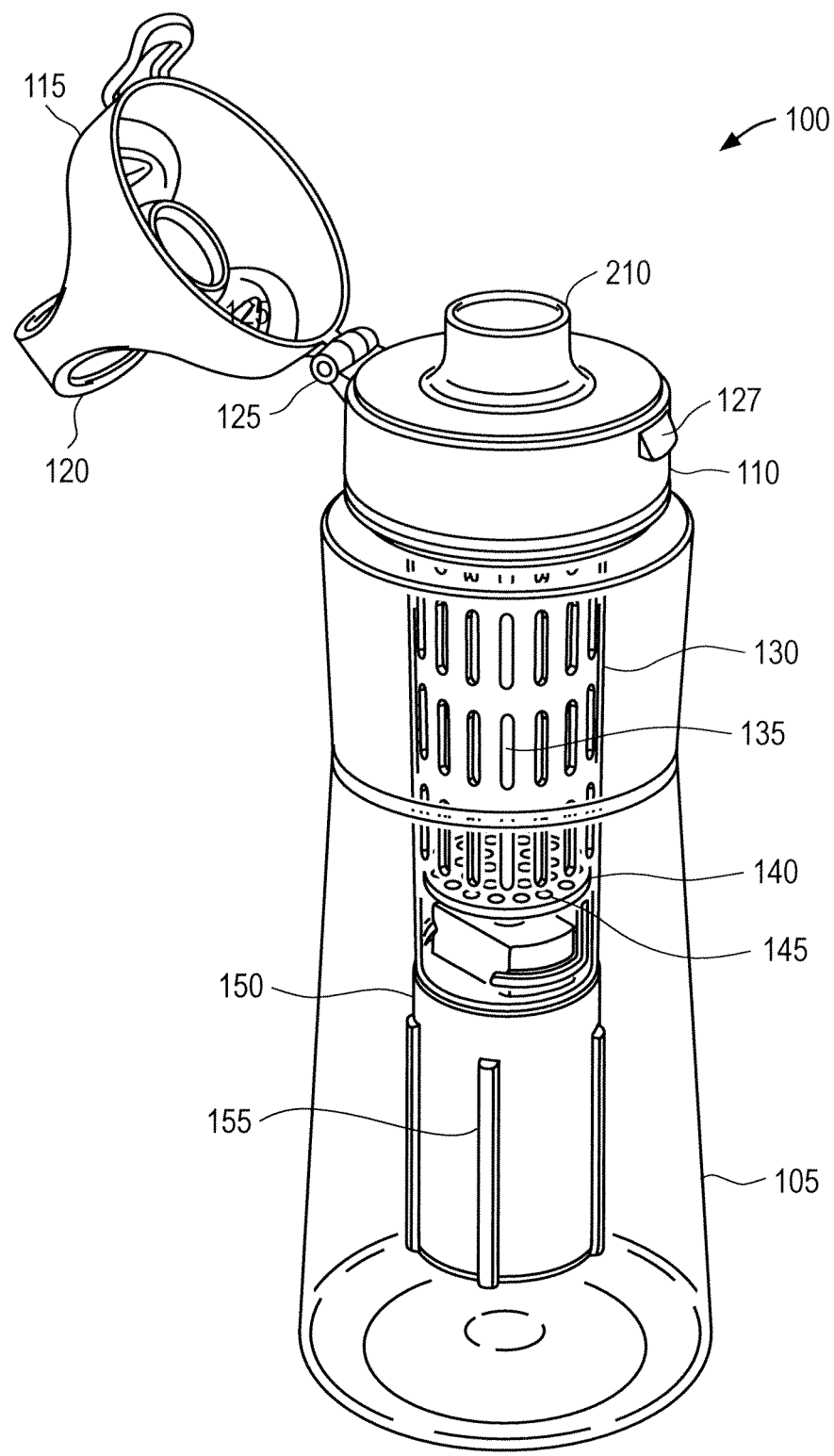
FIG. 2 is a top perspective view of an example hydration bottle with a cap in an open position.

FIG. 1 is a top perspective view of a hydration bottle 100 in accordance with an embodiment of the present invention. FIG. 2 is a top perspective view of the hydration bottle with a cap 115 in an open position. The hydration bottle 100 is adapted to simultaneously infuse and cool a beverage. The hydration bottle may include a container 105, lid 110, cap 115, infuser chamber 130, and a cold pack 150.

Figure 3:
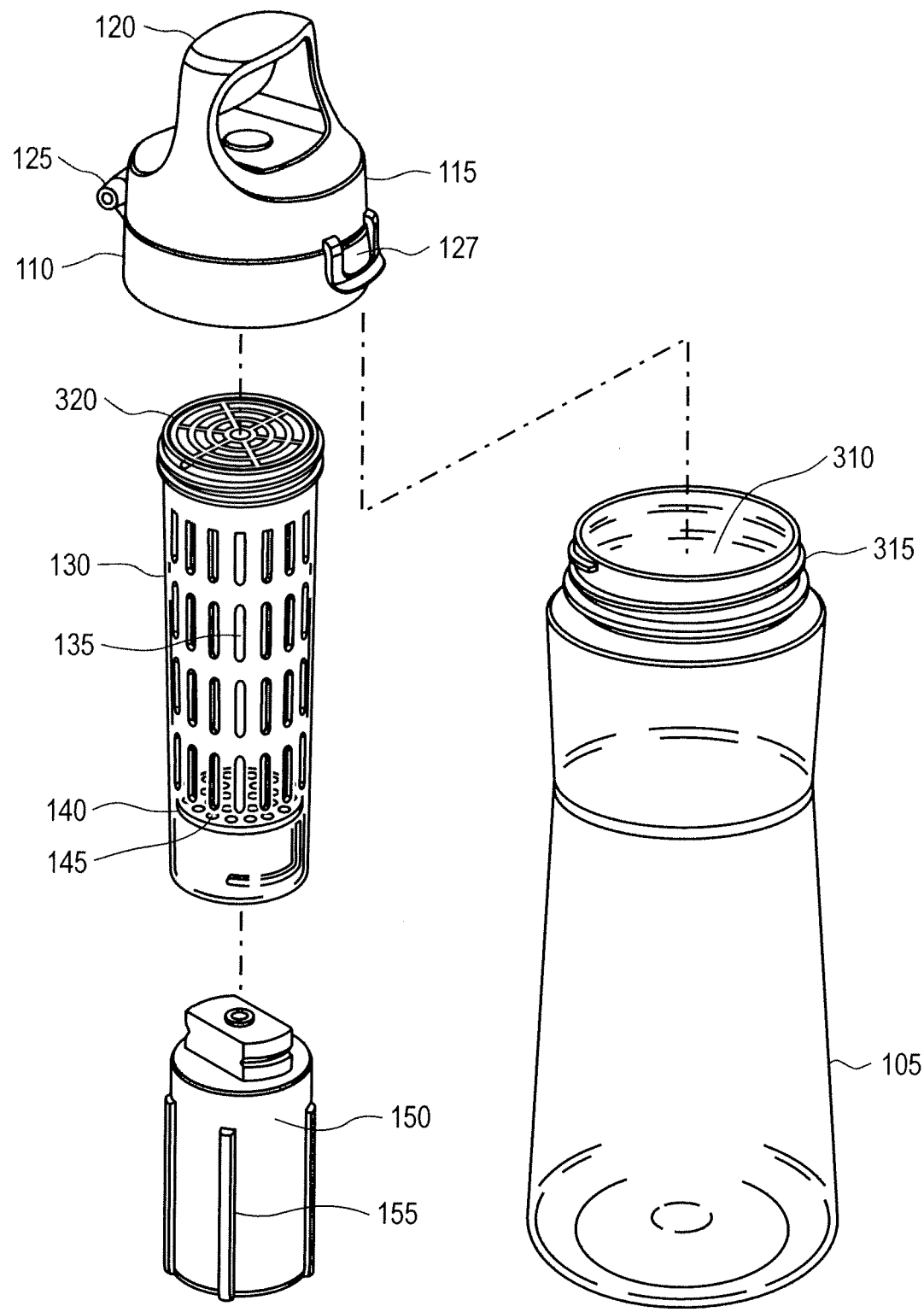
FIG. 3 illustrates an example of how a lid, cap, filter component, infuser chamber, cold pack, and container can be assembled to form a hydration bottle.

FIG. 3 illustrates an example of how a lid 110, cap 115, filter component 320, infuser chamber 130, cold pack 150, and container 105 can be assembled to form a hydration bottle 100 that is capable of infusing and cooling a beverage. The container 105 has an opening 310 defined by a rim 315 that allows liquid to enter and exit the container 105. In one embodiment, the region below the rim 315 may be threaded for mating engagement with the lid 110. Other mechanisms for mating the lid 110 to the opening 310 of the container 105 that are well-known to those of ordinary skill in the art are contemplated as well. For example, threads may be formed on the inside of the container 105 (rather than on the outside as shown in the example here). The container 105 can be fabricated from a variety of materials such as plastic, rubber, metal, copolyester (such as copolyesters available under the TRITAN™ mark from Eastman Chemical Company of Kingsport, Tenn.), or any material suitable for storing beverages. In one embodiment, the container 105 is fabricated from a clear polycarbonate or epoxy plastic that is free of BPA (Bisphenol A) to allow visual access into the container 105.

Now referring to FIG. 1, the lid 110 detachably attaches to the rim 315 of the container 105 to cover the opening 310 of the container 105. As discussed above, the lid 110 may attach to the container 105 using a threaded mechanism or any other mechanism that allows for secure attachment and detachment. Now referring to FIG. 2, where the lid 110 is fitted to the container 105 and covers the opening 310, the lid 110 has a sipping hole 210 that allows liquid to flow out of the container 105. In one embodiment, the sipping hole 210 is formed at the end of a spout that may protrude out of the lid 110 as shown, where the spout is to allow for easier consumption of a beverage contained in the container 105. Other types of spouts, or mechanisms for allowing easier consumption of a beverage from a bottle, that are well known to those of ordinary skill in the art are contemplated as well.

Figure 4:
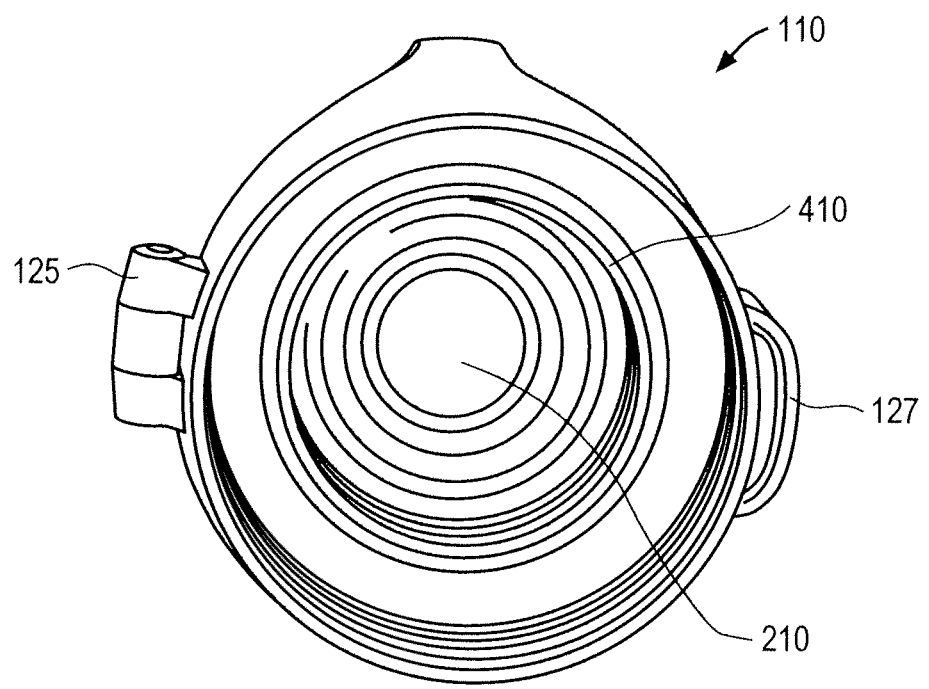
FIG. 4 is a bottom view of an example lid.

FIG. 4 is a bottom view of the lid 110 in accordance with an embodiment of the present invention. The lid 110 has a bottom face that faces towards the container when the lid 110 covers the opening 310 of the container 105. The bottom face includes a mating portion 410 that is formed inward of an outer periphery of the lid 110, and goes around or encircles the sipping hole 210. The mating portion 410 is for mating engagement with the infuser chamber 130 (see FIG. 2). In one embodiment, the mating portion 410 is threaded. In other embodiments, the infuser chamber 130 may attach to the lid 110 using other mating mechanisms that are well-known to those of ordinary skill in the art. For example, the infuser chamber 130 may attach to the bottom face of the lid 110 using a snap and click or a twist and lock mechanism.

Now referring to FIG. 2, in one embodiment, the hydration bottle 100 includes a cap 115 to seal the sipping hole 210. The cap 115 can seal the sipping hole 210 when it is attached to the lid 110. The cap 115 may have an elastic sealing surface that forms an air-tight seal or a water-tight seal when pressed against the spout so as to prevent a beverage from leaking out of the sipping hole 210 when the cap 115 is in a closed position. In one embodiment, the cap 115 can attach to the lid 110 using a threaded attachment mechanism. In other embodiments, the cap 115 may attach to the lid 110 using other mating mechanisms that are well-known to those of ordinary skill in the art. In one embodiment, such as the one illustrated in FIG. 1 and FIG. 2, the cap 115 is connected to the lid 110 at its outer periphery by a hinge 125, which enables the bottle to be opened and closed by pivoting the cap 115 about the hinge 125. A snap mechanism 127 may be provided at the opposite end of the cap 115 from the hinge 125 as shown, to maintain the cap 115 in its closed position. In one embodiment, the cap 115 may include a handle 120 for carrying the hydration bottle 100.

Figure 5:
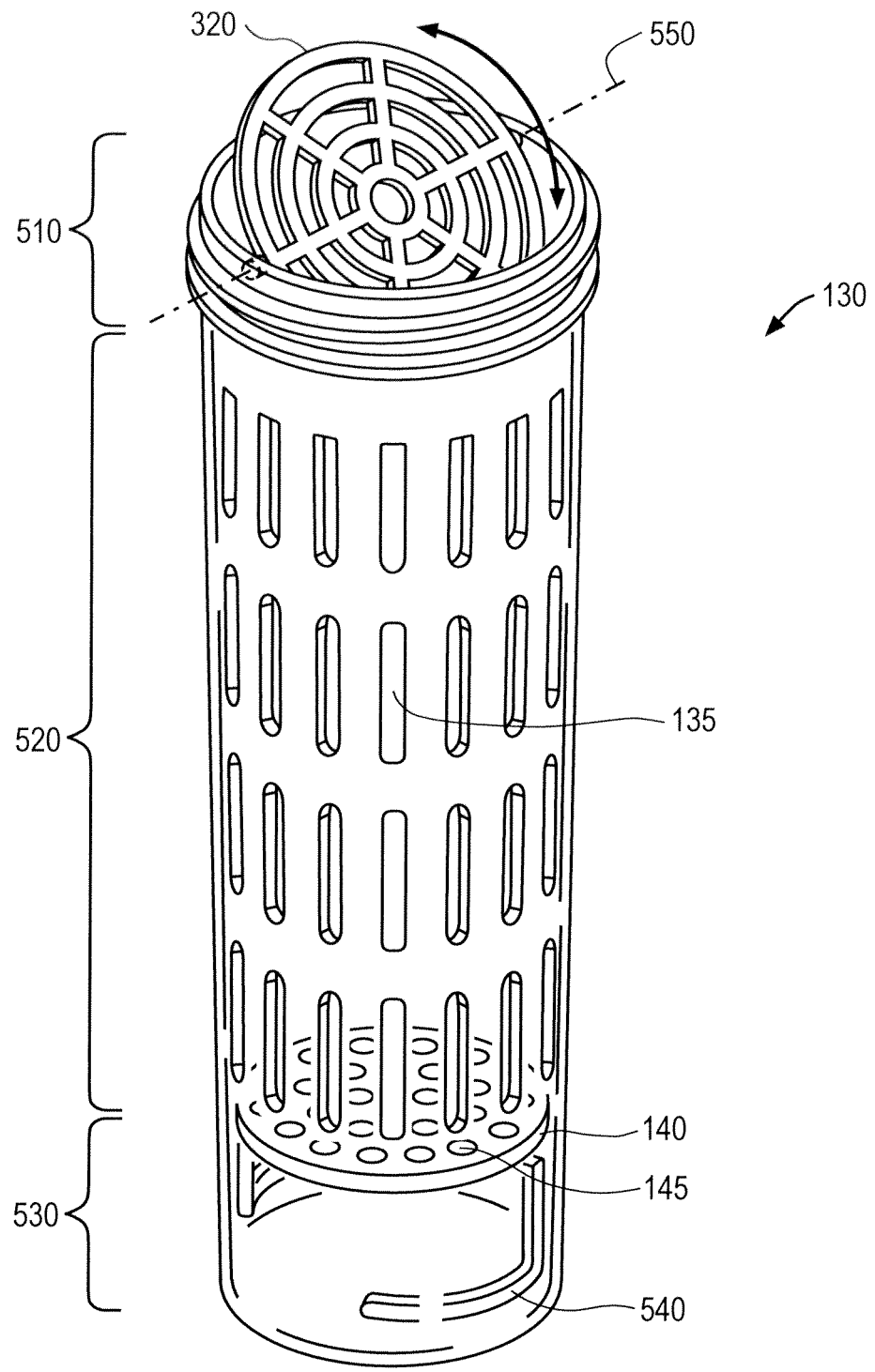
FIG. 5 illustrates an example of an infuser chamber.

FIG. 5 illustrates an example of the infuser chamber 130 in accordance with an embodiment of the present invention. Flavor solids can be placed inside the infuser chamber 130 to infuse a beverage stored in the hydration bottle 100. A flavor solid, as used herein, refers to any food item or other artificial or natural flavoring that can infuse a beverage with flavor and/or nutrients. For example, flavor solids can include, but are not limited to, fresh fruit, frozen fruit, tea bags, and herbs. The infuser chamber 130 is elongated in the height direction of the hydration bottle 100 and is generally shaped as a hollow structural section. The infuser chamber 130 may have a tubular cross section which may be circular (as shown), square, rectangular, or elliptical. The infuser chamber 130 can be fabricated from a variety of materials such as plastic, rubber, metal, copolyester (such as copolyesters available under the TRITAN™ mark from Eastman Chemical Company of Kingsport, Tenn.). In some embodiments, the infuser chamber 130 is fabricated from the same material as the container 105.

The infuser chamber 130 has a top end portion 510 that detachably engages with the mating portion 410 on the bottom face of the lid 110 (see FIG. 3 and FIG. 4) to securely attach the infuser chamber 130 to the lid 110. As discussed above, the infuser chamber 130 may attach to the lid 110 using a threaded attaching mechanism, snap and click mechanism, or any other mechanism that allows for secure attachment and detachment. Threads, snap and click features, or other mating features can be formed on the outside surface (as shown) or on the inside surface of the tubular section of the infuser chamber 130.

The infuser chamber 130 has a wall portion 520 that includes multiple openings 135, which allow liquid to flow in and out of the infuser chamber 130. In one embodiment, the openings 135 are shaped as vertical elongated ovals. In other embodiments, the openings 135 may have any shape or size that keeps at least most of the flavor solids contained within the infuser chamber 130 while allowing liquid to flow in and out of the infuser chamber 130.

The infuser chamber 130 further includes a bottom end portion 530. A base 140 is fitted inside the bottom end portion 530 of the infuser chamber 130, attached to the inside surface of the tubular section (as shown) that keeps flavor solids contained within the infuser chamber 130. In one embodiment, the base 140 may have multiple holes 145 that allow liquid to flow in and out the infuser chamber 130 through the base 140 and through the open end of the bottom end portion 530, when the cold pack 150 is detached from the infuser chamber 130 (see FIG. 6). In other embodiments, the holes 145 in the base 140 may have any shape or size that keeps at least most of the flavor solids contained within the infuser chamber 130 while allowing liquid to flow in and out of the infuser chamber 130.

The bottom end portion 530 of the infuser chamber 130 also includes a mating portion 540 formed below the base 140, for mating engagement with the cold pack 150 (see FIG. 2 and FIG. 3). In one embodiment, the mating portion 540 is a threaded region formed on the inside surface of the tubular section at the bottom end portion 530 (as shown), just above the bottom open end of the infuser chamber 130. In other embodiments, the cold pack 150 may attach to the infuser chamber 130 using other mating mechanisms that are well-known to those of ordinary skill in the art. For example, the cold pack 150 may attach to the infuser chamber 130 using a snap and click mechanism. In another embodiment, the cold pack 150 can attach to the infuser chamber 130 using a twist and lock mechanism. Threads, snap and click features, or other mating features can be formed on the inside surface (as shown) or on the outside surface of the tubular section of the infuser chamber 130.

Now referring to FIG. 3 and FIG. 5, in one embodiment, a filter component 320 is positioned between the top open end of the infuser chamber 130 and the sipping hole 210 of the lid 110, to prevent flavor solids from exiting the infuser chamber 130 through the top open end when the hydration bottle 100 is tilted by the user, for example while drinking through the sipping hole 210 in the lid 110, but at the same time allowing liquid to flow out of the sipping hole 210. The filter component 320 may be shaped like a disk, or any other shape that matches the shape of the cross-section of the tubular section. In one embodiment, the filter component 320 is directly attached to the infuser chamber 130 and rotates about an axis 550 that bisects the opening in the top end portion of the infuser chamber 130. The rotating filter component 320 may have pins that protrude at opposite ends that fit into respective slots on the inner surface of the tubular section. The rotating filter component 320 allows a user to rotate the filter 90 degrees to easily insert flavor solids into (or remove them from) the infuser chamber 130 (while keeping the filter component 320 attached to the infuser chamber 130 so that it does not get lost). The user can then rotate the filter component 320 back 90 degrees to close off the top open end of the infuser chamber 130. As an alternative to locating the pins on the filter component 320, the pins could protrude from the inner surface of the tubular section (of the infuser chamber 130). In other embodiments, the filter component 320 may be detachably attached to the infuser chamber 130.

Now referring to FIG. 3, the cold pack 150 cools the beverage contained in the container 105. The cold pack 150 detachably engages with the mating portion 540 on the bottom end portion 530 of the infuser chamber 130 to secure the cold pack 150 to the infuser chamber 130. As discussed above, the cold pack 150 may attach to the infuser chamber 130 using a threaded attaching mechanism or any other mechanism that allows for secure attachment and detachment. In one embodiment, the cold pack 150 comprises non-toxic freezer gel enclosed in a case. In another embodiment, the cold pack 150 includes a liquid with a high thermal capacity such as water, an aqueous solution, or similar liquids. The cold pack 150 can be kept in a freezer for some time to cool it down, before being attached to the infuser chamber 130. The cold pack 150 can have ridges 155 on its outside surface as shown, to provide the user with better grip when attaching and detaching the cold pack 150. For example, a cold pack 150 that attaches to the infuser chamber 130 by a twist and lock mechanism may have vertical ridges 155 on the outside surface of the case to allow for easier twisting of the cold pack 150.

Figure 6:
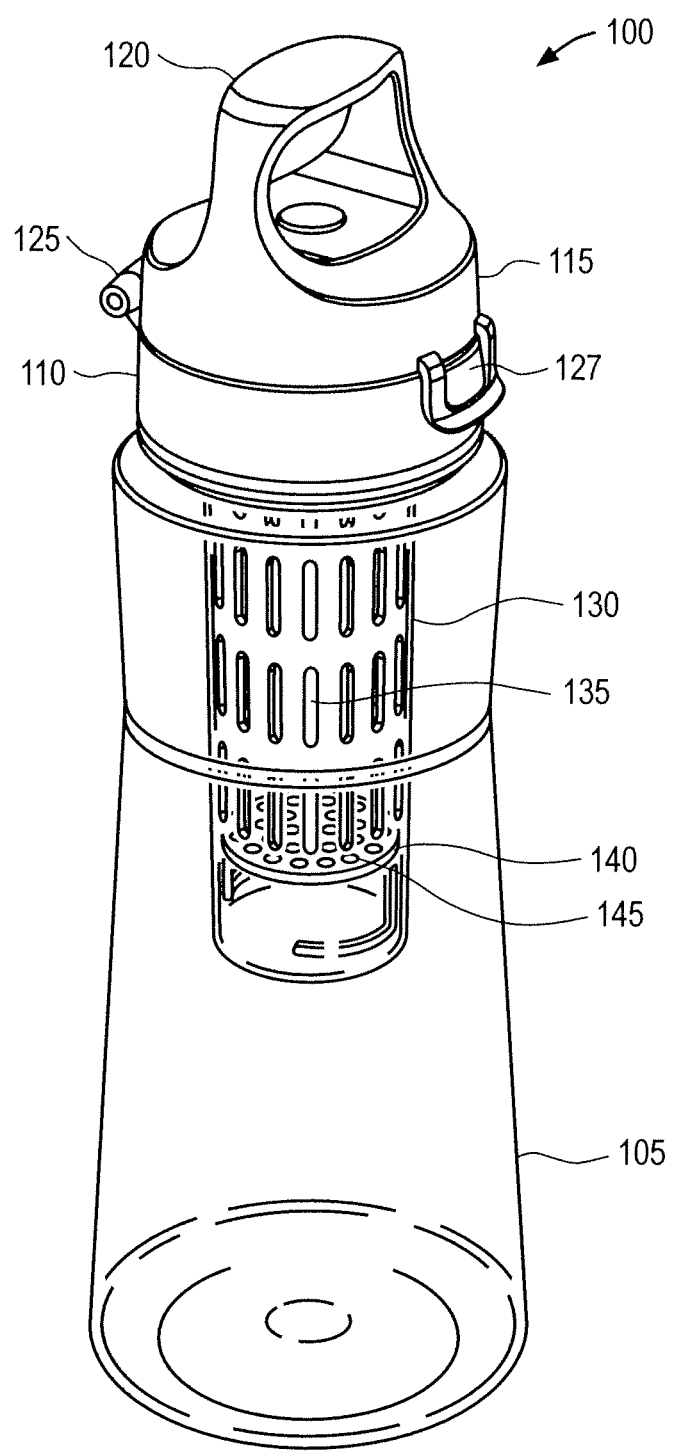
FIG. 6 illustrates an example of a hydration bottle configured as an infuser-only hydration bottle.
Figure 7:
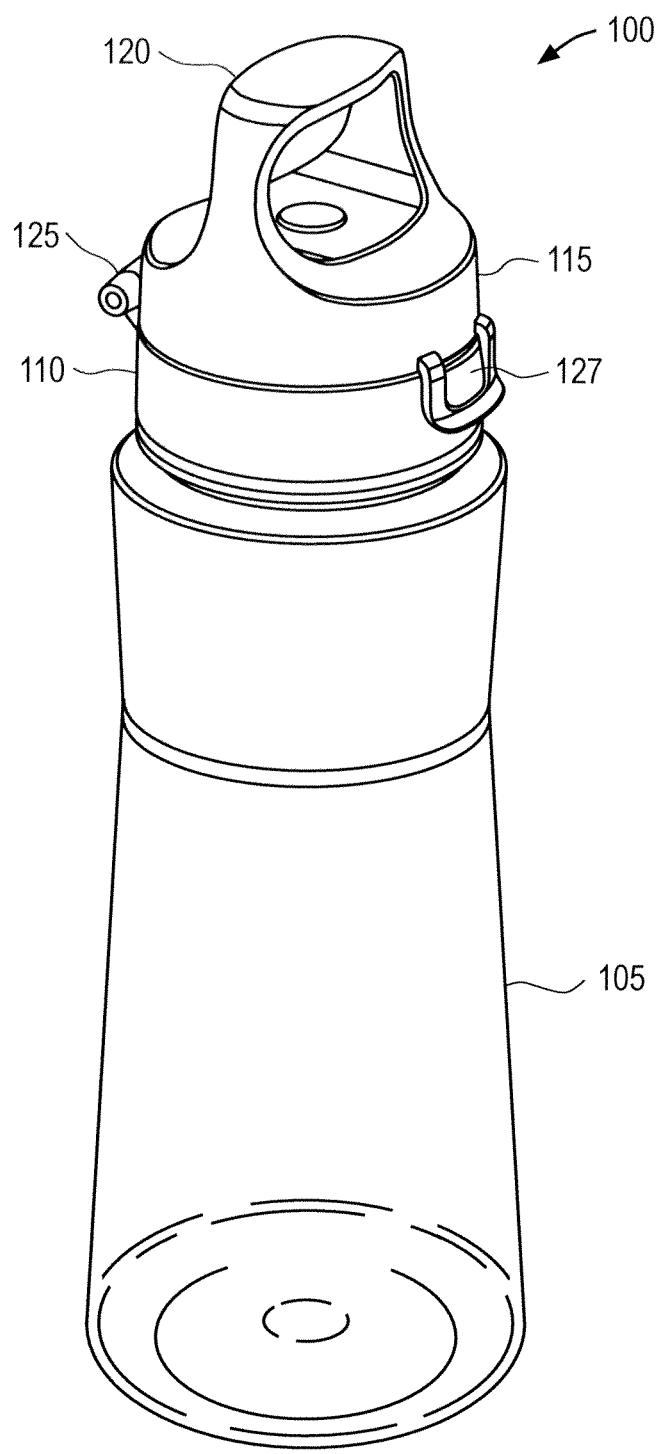
FIG. 7 illustrates an example of a hydration bottle without any infuser chamber or cold pack.

An advantage of the hydration bottle 100 described in the present invention is that it is capable of infusing and cooling a beverage. Furthermore, the hydration bottle 100 can be configured in three different ways, according to a user's desires and needs. First, as illustrated in FIG. 1, the hydration bottle can be configured to provide both beverage infusion and cooling. In a second configuration, as illustrated in FIG. 6, the hydration bottle 100 can be configured as an infuser-only hydration bottle by detaching the cold pack 150 from the infuser chamber 130. In a third configuration, as illustrated in FIG. 7, the hydration bottle 100 can be configured as a regular hydration bottle without infusion and cooling by detaching the infuser chamber 130 from the lid 110. As such, a user can easily customize the configuration of the hydration bottle 100 according to the user's desires and needs.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A bottle for infusing and cooling a beverage comprising:
   a container having an opening;
   a lid that detachably attaches to the opening, the lid having a sipping hole to allow liquid flow and a first mating portion formed on a bottom face of the lid, inward of an outer periphery of the lid, and around the sipping hole;
   an infuser chamber for holding a flavor solid, the infuser chamber having a top end portion, wall portion, and a bottom end portion, the top end portion detachably engages with the first mating portion of the lid so as to secure the infuser chamber to the lid, the wall portion having a plurality of openings to allow liquid flow into the infuser chamber, and the bottom end portion having 1) a base to keep the flavor solid contained within the infuser chamber and 2) a second mating portion;
   a filter component positioned between the top end portion of the infuser chamber and the sipping hole of the lid, and having a first state that keeps the flavor solid from exiting the infuser chamber but allows liquid to flow out of the sipping hole, and a second state that allows removal of the flavor solid from the infuser chamber; and
   a cold pack that detachably engages with the second mating portion to secure the cold pack to the bottom end portion of the infuser chamber.

2. The bottle of claim 1 wherein the first mating portion in the lid is threaded.

3. The bottle of claim 1 wherein the second mating portion in the infuser chamber is threaded.

4. The bottle of claim 1 wherein the cold pack attaches to an inside surface of a tubular section of the infuser chamber below the base, through a bottom open end of the infuser chamber.

5. The bottle of claim 1 wherein the base of the infuser chamber has a plurality of holes to allow liquid flow when the cold pack is detached from the infuser chamber.

6. The bottle of claim 1 wherein the filter component is directly attached to the infuser chamber and rotates about an axis that bisects a top open end of the infuser chamber.

7. The bottle of claim 1 further comprising a cap to seal the sipping hole.

8. The bottle of claim 1 wherein the cold pack comprises non-toxic freezer gel enclosed in a case.

9. The bottle of claim 1 wherein an outside surface of the case of the cold pack has a plurality of ridges for ease of gripping and twisting the cold pack by a user.

* * * * *